Sept. 25, 1962   C. F. DRETZKE ET AL   3,055,649
DEVICES FOR UNLOADING MATERIALS FROM
SILOS AND OTHER STORAGE FACILITIES
Filed Nov. 6, 1959   5 Sheets-Sheet 1

INVENTORS
CARL F. DRETZKE
LORENZE R. ANDERSON
BY
Joseph G. Werner
ATTORNEY

INVENTORS
CARL F. DRETZKE
LORENZE R. ANDERSON
BY
Joseph G. Werner
ATTORNEY

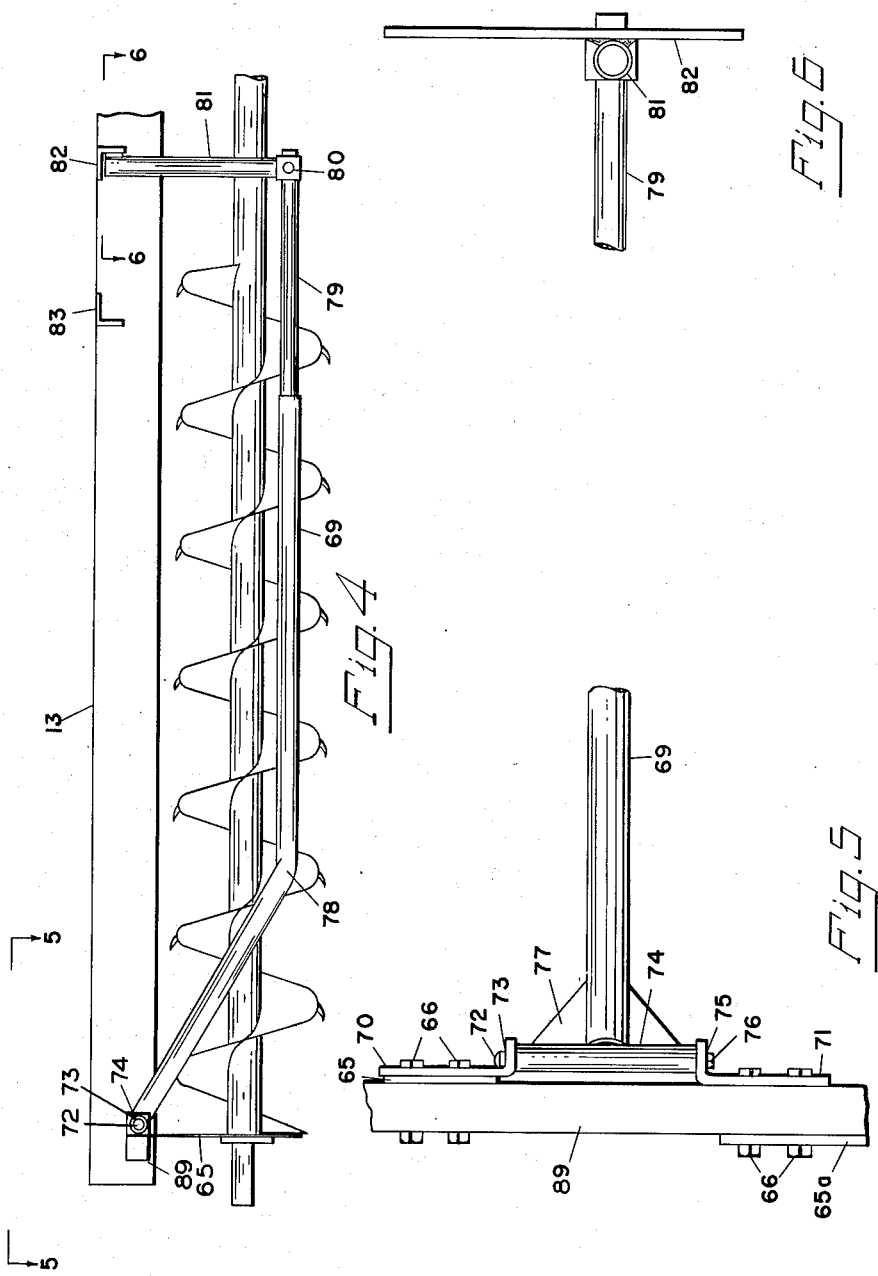

Sept. 25, 1962

C. F. DRETZKE ET AL 3,055,649

DEVICES FOR UNLOADING MATERIALS FROM
SILOS AND OTHER STORAGE FACILITIES

Filed Nov. 6, 1959

*INVENTORS*
CARL F. DRETZKE
LORENZE R. ANDERSON
BY
*Joseph G. Werner*
ATTORNEY

United States Patent Office 3,055,649
Patented Sept. 25, 1962

3,055,649
DEVICES FOR UNLOADING MATERIALS FROM SILOS AND OTHER STORAGE FACILITIES
Carl F. Dretzke and Lorenze R. Anderson, Manawa, Wis.
Filed Nov. 6, 1959, Ser. No. 851,293
8 Claims. (Cl. 262—19)

The present invention relates to improvements in devices for unloading materials from silos or other storage facilities, and more particularly improvements which place the materials in the silo in such condition as to facilitate the unloading thereof.

This invention is concerned with improvements for certain purposes over the inventions disclosed in the copending application for patent of Carl F. Dretzke, Serial No. 720,848, filed March 12, 1958. The subject matter of this invention which are the result of joint invention by the applicants herein is the flail bar and means of attachment therefor to the silo unloading device as hereinafter described.

Although the invention described in said co-pending application operates very successfully, we have discovered that removal of materials from silos or other storage buildings is facilitated when large masses or chunks of such materials can be reduced in size before being fed to the thrower and when materials of more uniform size are provided for the thrower. Accordingly, it is an object of this invention to provide improvements in devices for unloading materials from silos or other storage facilities for more efficient operation by providing a steadier flow of materials to the blower in either warm or cold temperatures.

It is another object of the invention to provide such a device which avoids overloading of the blower with chunks of materials.

Another object of the invention is to provide such a device which shreds and cuts long or stringy materials into smaller pieces for easier handling by the thrower.

A further object of the invention is to provide such an improvement which will cooperate with the surface-leveling portion of the unloading device.

Still another object of the invention is to provide such an improvement which can be used with either a single-auger or a double-auger unloader.

Other objects and advantages will be apparent from the following detailed explanation taken in conjunction with the accompanying drawings wherein a preferred embodiment of the principles of the invention has been selected for exemplification.

In the drawings:

FIG. 4 is a side elevational fragmentary view of the flail bar and one auger of a double-auger unloading device with hook knives on the line 3—3 of FIG. 1.

FIG. 5 is a top plan view of the outer attachment of the flail bar on the line 5—5 of FIG. 4.

FIG. 6 is a top plan view of the inner attachment of the flail bar on the line 6—6 of FIG. 4.

Figure 1:
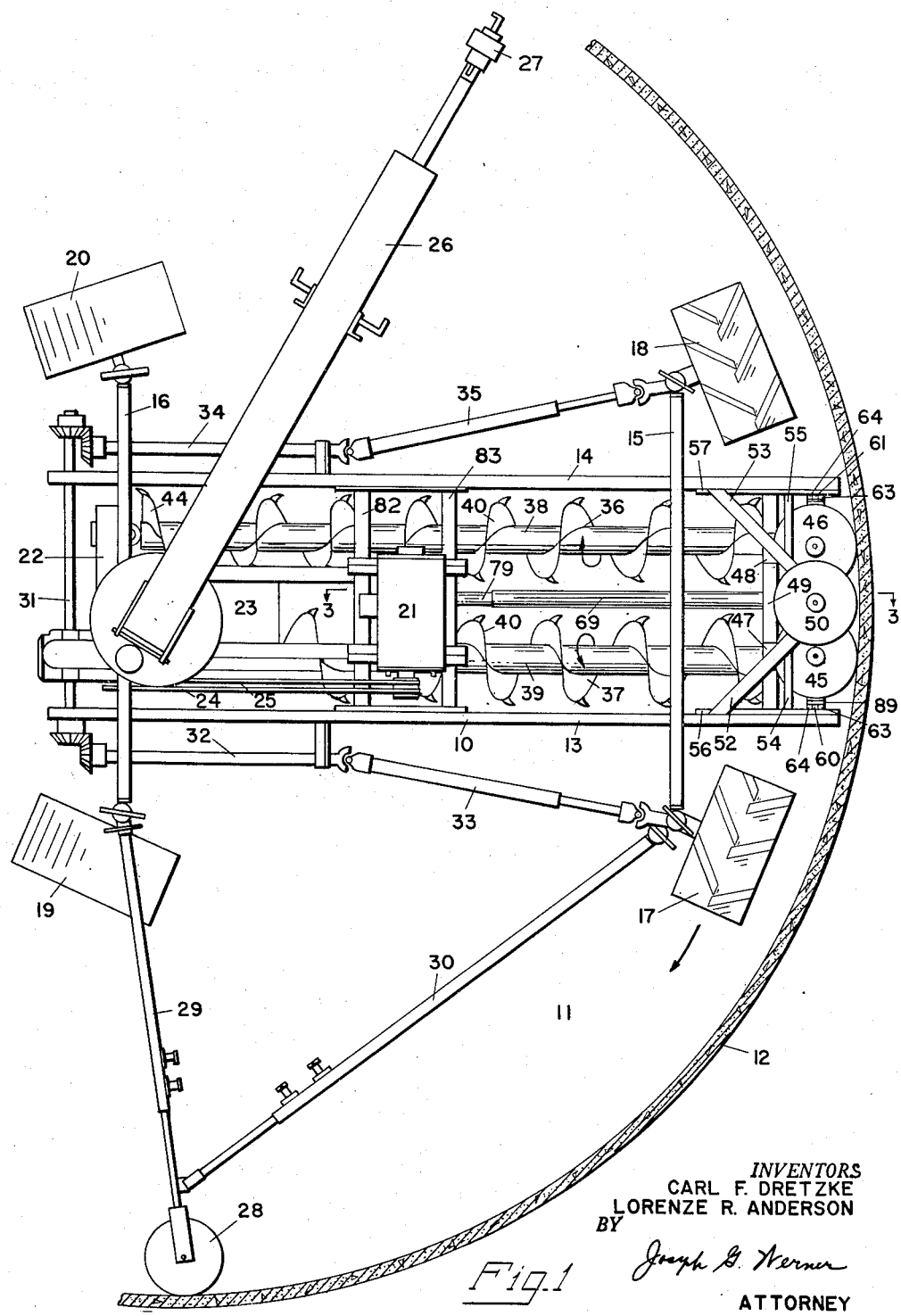
FIG. 1 is a top plan view of a double-auger unloading device having our improvements within a fractional section of the silo.

Referring more particularly to the drawings, wherein like numerals refer to like parts, the silo unloader indicated in its entirety at 10 is positioned on silage 11 in silo 12. Frame members 13 and 14 are secured to axle tubings 15 and 16, which support drive wheels 17 and 18 and idler wheels 19 and 20, respectively. The frame members carry the motor 21, the gear box 22 and thrower 23 which are energized by belts 24 and 25. Materials brought into the thrower are thrown into thrower pipe 26 and ejected through the open silo door. Thrower pipe 26 is retained in position in relation to the silo by attachment 27 as the frame revolves within the silo. Guide wheel 28, retained in position by shafts 29 and 30, operates in advance of the revolving frame members and assists in retaining the inner end of such frame in position relative to the vertical axis of the silo. The gears (not shown) in gear box 22 power drive wheels 17 and 18 through drive shafts 31, 32, 33, 34 and 35.

Figure 2:
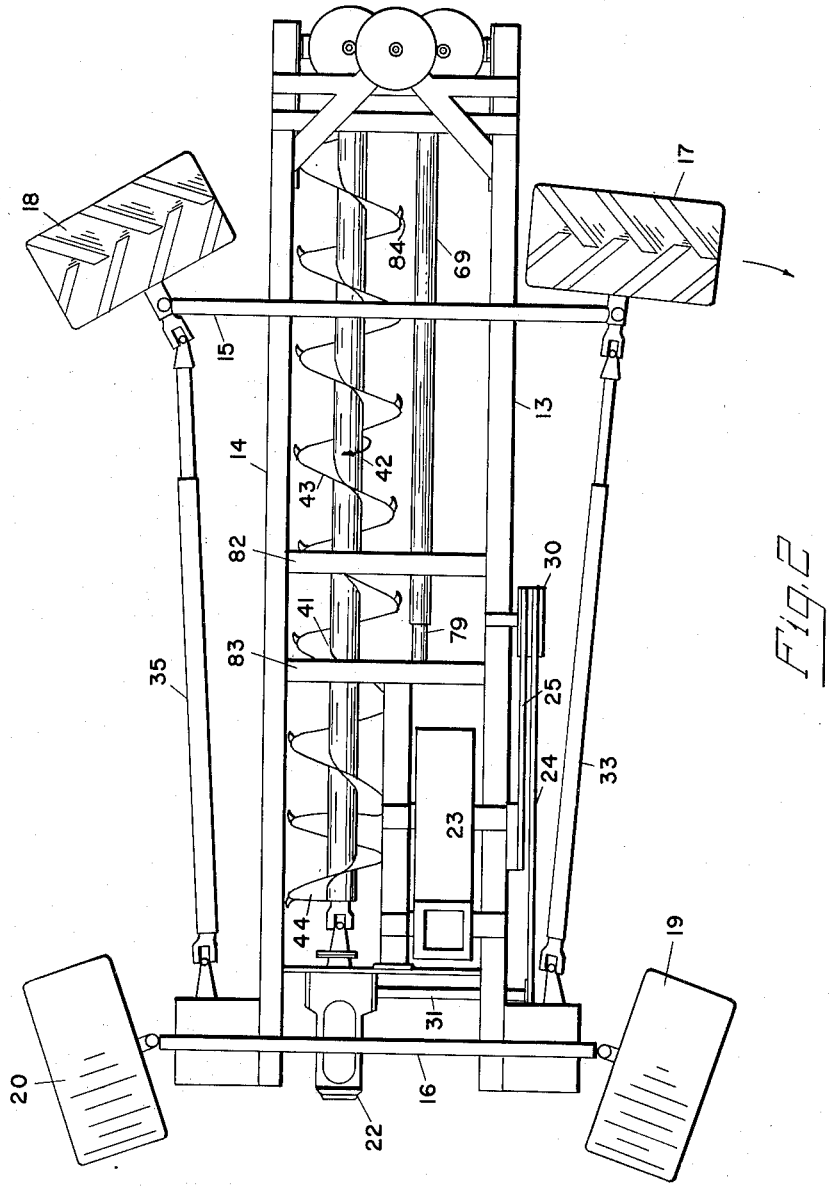
FIG. 2 is a top plan view of a single-auger unloading device having our improvements with the motor, the thrower pipe and certain guide apparatus removed.

Augers 36 and 37 with auger pipes 38 and 39 and flighting 40 in FIG. 1, and single auger 41 having auger pipe 42 and flighting 43 in FIG. 2, are likewise activated to revolve around the longitudinal axis of the respective auger pipes by gears (not shown) in gear box 22, as described in detail in co-pending application Serial No. 720,848. In the augers shown in FIG. 1 auger 36 is a left hand auger and auger 37 is a right hand auger, and they operate in opposite directions as indicated by the arrows. The end of auger 36 nearest the gear box 22 has a short piece of right-hand flighting 44 to reverse the silage to direct it into thrower 23.

Figure 3:
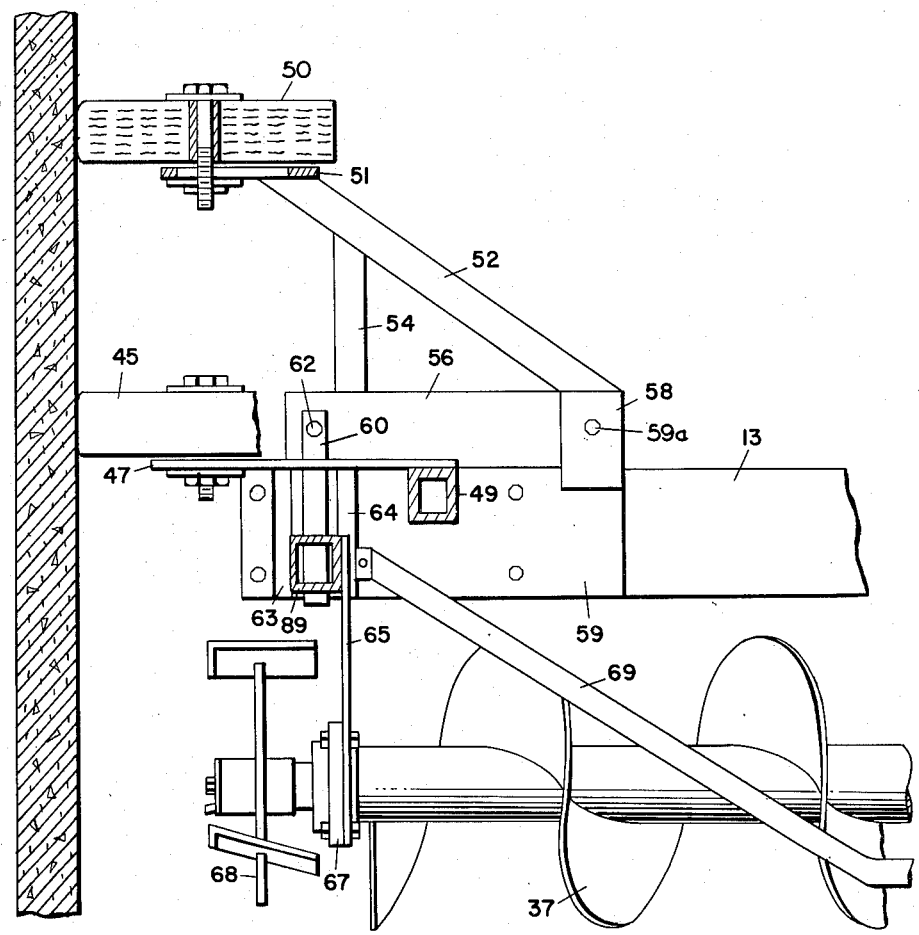
FIG. 3 is an enlarged fragmentary sectional side view of the outer end of an auger showing our flail bar attachment in relation to the automatic levelling construction on the line 3—3 of FIG. 1.

Guide wheels 45 and 46 are rotatably secured to brackets 47 and 48 which are attached to divider bar 49 at the outer extremity of frame members 13 and 14. Leveler guide wheel 50 is rotatably secured to mounting plate 51 which is retained in position by leveler braces 52 and 53 and gussets 54 and 55. Gussets 54 and 55 are welded to leveler braces 52 and 53, respectively, and to lifters 56 and 57, respectively. Leveler braces 52 and 53 are welded to mounting plate 51 and lifters 56 and 57 respectively as shown in FIGS. 1 and 3. Levelling hinges 58 are welded to plates 59 which are secured to frame members 13 and 14, respectively. Levelling hinges 58 are secured to lifters 56 and 57, respectively, by bolts 59a with bushings for each lifter as illustrated in FIG. 3.

Yoke risers 60 and 61 are secured to lifters 56 and 57 by bolts 62 which preferably have bushings to permit movement of lifters 56 and 57 in relation to the respective yoke risers. Yoke risers 60 and 61 are secured to divider bar 89 by welding or other suitable means, and such yoke risers are held in position between two alignment pins 63 and 64 which are suitably attached to mounting plates 59.

Auger hangers 65 and 65a are secured to divider bar 89 by bolts 66, and also carry the out ends of augers 36 and 37 and bushings 67. Silage chippers 68 are carried at the end of the respective augers 36 and 37.

Where, as described above and shown in FIGS. 1, 2 and 3, there is an automatic leveller device, the flail bar 69 is hingedly secured to divider bar 89. A preferred method of such attachment is shown in FIG. 5. Right angled carriers 70 and 71 are secured to divider bar 89 by bolts and nuts 66. Bolt 72 extends through the aperture 73 in carrier 70, through tubing 74 and through aperture 75 in carrier 71 secured by nut 76. Flail bar 69 is welded to tubing 74, and such attachment may be reinforced with webbing 77. The flail bar 69 extends downward from its attachment with tubing 74 as shown in FIG. 4, bending at 78 and extending toward the vertical axis of the silo 12. Where the unloader has such an automatic leveller device, the flail bar should also have an inner telescoping tube 79, which is hingedly connected by bolt 80 to tubing 81. Tubing 81 is securely attached by welding to support frame member 82, which, along with support frame member 83, also supports the motor 21.

Where no automatic levelling device is used, the flail bar 69 may be rigid, and in such case the flail bar need not be telescoped, and no hinging at the ends of the flail bar is required.

Figure 8:
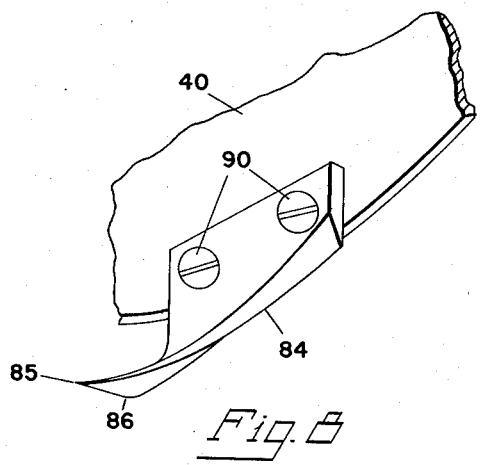
FIG. 8 is an enlarged view of one of the hook knives secured to a portion of an auger on the line 8—8 of FIG. 7.
Figure 7:
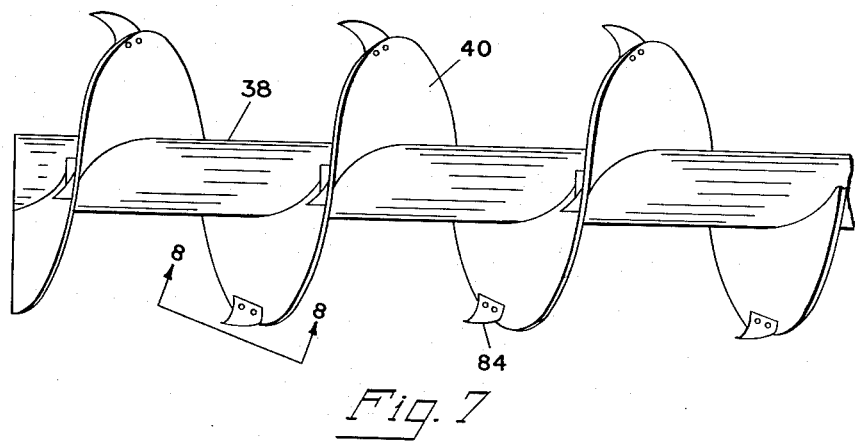
FIG. 7 is a fragmentary side view of an auger with hook knives secured thereto.

Attached to the auger flighting 40 and 43 are hook knives 84 of hard metal having a curvature as shown in FIG. 8 and terminating in a sharp point 85, which hook knives cooperate with the flail bar 69 in providing suitably sized silage material to thrower 23. Such knives are secured by screws 90 or other desirable means to the edge portion of flighting 40 and 43 as illustrated in FIG. 5. When screws or bolts are used to secure the hook knives 84 to auger flighting 40, the knives may be easily removed for replacement or sharpening, if necessary. The hook knife has a sharpened forward cutting edge 86 which cuts the silage and is particularly effective in slicing off frozen silage in cold climates. The hook knives 84 are so positioned on the auger flighting that the sharp cutting edge 86 of the knife engages the surface of the silage material 11. The cutting edges 86 of the hook knives are forwardly curved in the same direction as the respective auger flighting to which the hook knives are attached. The hook knives 84 are preferably regularly spaced along the periphery of flighting 40 or 43, but may be spaced as desired for particular kinds of silage or other conditions.

Referring to the double-auger silo unloader shown in FIG. 1, the flail bar 69 places a downward pressure on the silage between the augers to hold it down momentarily to provide for a better distribution of the silage carried by the augers 36 and 37, as the augers pull the silage apart. Without the flail bar, large amounts or chunks of silage are sometimes carried to the thrower so as to clog the thrower 23. The downward pressure of the flail bar on the silage between the augers, as the augers pull the chunks of silage into smaller portions, minimizes the likelihood of such clogging. Thus, it is seen that the flail bar provides a useful purpose even when the hook knives 84 are not secured to the augers. Preferably flail bar 69 is located slightly above the lower edges of the auger flighting 40 and 43, as shown in FIG. 4. The location of flail bar 69 may, however, be varied as to its height in relation to the lower edge of the auger flighting, depending upon the type of silage to be removed and other particular conditions that may exist.

However, when the hook knives 84 are secured to the auger flighting 40 and 43 as shown in FIGS. 1 and 2 respectively, the flail bar and the hook knives cooperate to produce even greater uniformity in the feeding of the silage to the thrower. As the flail bar holds down the silage between the augers, the hook knives cut the silage into smaller pieces, so as to pass through thrower 23 more easily and in more uniform size. The cutting of the silage, both frozen and unfrozen, is facilitated by having the hook knives curved in the same direction as the auger flighting to which they are attached. The hook knives also tend to throw the cut silage into the path of the auger. These features constitute a substantial improvement over the straight auger knives disclosed in copending application Serial No. 720,848. The sharp hook knives 84 are also helpful in slicing frozen silage as they revolve over the surface of the silage for conveyance by augers to the thrower. Although the flail bar and the hook knives may be used independently on the silo unloader, the best results are produced by the cooperation of the flail bar and the hook knives as hereinabove discussed.

The operation of the flail bar and hook knives is substantially the same when used with a single-auger unloader as shown in FIG. 2, as with the double-auger unloader. As some of the silage is held down by the flail bar 69, the flow of silage passing into the thrower 23 is more uniform in size with fewer large chunks to clog the thrower. The hook knives with the single-auger unloader also cut the silage into smaller pieces as the flail bar holds the silage down momentarily to provide a better flow of material to the thrower.

FIGS. 3, 4 and 5 show the hinged arrangement of the flail bar when it is used with a silo unloader having an automatic levelling device as described above and in copending application Serial No. 720,848. Thus, when the terrain of the silage is uneven and the augers are raised or lowered with respect to frame members 13 and 14 by the increased or decreased pressure of leveller guide wheel 50 against the silo wall 12, the flail bar 69 can adjust itself to remain in substantially the same position relative to the auger 41 in the single-auger unloader, or relative to augers 36 and 37 in the double-auger unloader. The hinged connections of the flair bar 69 with divider bar 89 and between the flail bar and tubing 81, along with the telescoping of tube 79 within flail bar 69 provide the necessary flexibility for providing such adjustment, and also prevent breakage of the flail bar.

Where the silo unloader is not provided with an automatic levelling device, there is no need for hinging the flail bar at each end or for the telescoping of the flail bar. In such case, the flail bar will remain in constant relation with the auger or augers by rigid connection of the flail bar to its supporting members.

It is to be understood that the present invention is not confined to the particular construction and arrangement of parts herein illustrated and described, but embraces all such modified forms thereof as may come within the scope of the following claims.

We claim:

1. In a silage unloader, an elongated main frame radiating from and being revolvable about the central upright axis of the silo, an elongated auger conveyor suspended from said frame being rotatably operable to transport silage inwardly toward said axis, means suspended from said frame forwardly of said conveyor to momentarily hold down a portion of said silage and means secured to said conveyor for cutting said silage while it is held down and feeding said cut silage to the conveyor.

2. In a silage unloader, an elongated main frame radiating from and being revolvable about the central upright axis of the silo, an elongated auger conveyor suspended from said frame being operable to transport silage inwardly toward said axis, an elongated flail bar suspended from said frame adjacent to and substantially parallel with said auger conveyor, said flail bar being forwardly of said auger conveyor and in contact with the surface of the silage as the frame revolves about said axis.

3. The invention of claim 2 additionally including means carried by said flail bar and said frame to permit vertical adjustment of the flail bar in relation to the frame when the auger conveyor is subjected to vertical movement with respect to said frame.

4. In a silage unloader, an elongated main frame radiating from and being revolvable about the central upright axis of the silo, an elongated auger conveyor having auger flighting suspended from said frame being rotatably operable to transport silage inwardly toward said axis, an elongated flail bar suspended from said frame adjacent to and substantially parallel with said conveyor, said flail bar being forwardly of said conveyor and in frictional contact with the surface of the silage as the frame revolves about said axis, curved hook knives secured to and extending outward from the outer periphery of the auger conveyor, the flail bar being in close spaced relation to said hook knives whereby said knives cut said silage into smaller pieces as it is held in frictional contact with said flail bar.

5. The invention of claim 4 wherein the hook knives are respectively curved in the same direction as the auger flighting to which said hook knives are secured.

6. In a silage unloader, an elongated main frame radiating from and being revolvable about the central upright axis of the silo, a plurality of elongated auger conveyors having auger flighting suspended from said frame being rotatably operable to transport silage inwardly toward said axis, an elongated flail bar suspended from said frame between said conveyors and in frictional contact with the surface of the silage as the frame revolves about said axis.

7. The invention of claim 6 additionally including means carried by said flail bar and said frame to permit flexible movement of the flail bar when the conveyor is subjected to vertical movement with respect to said frame.

8. In a silage unloader an elongated main frame radiating from and being revolvable about the central upright axis of the silo, a plurality of substantially parallel elongated auger conveyors suspended from said frame being rotatably operable to transport silage inwardly toward said axis, an elongated flail bar suspended from said frame between said conveyors and in frictional contact with the surface of the silage as the frame revolves about said axis, curved hook knives secured to and extending outwardly from the outer periphery of the auger conveyors, the flail bar being in relatively close spaced relationship to said hook knives whereby said hook knives cut said silage as it is held in frictional contact with said flail bar.

References Cited in the file of this patent

UNITED STATES PATENTS

| 2,417,313 | MacKinnon | Mar. 11, 1947 |
| 2,598,350 | Carroll | May 27, 1952 |
| 2,888,253 | Van Dusen | May 26, 1959 |

FOREIGN PATENTS

| 69,152 | Austria | June 25, 1915 |